(12) United States Patent
Kim et al.

(10) Patent No.: US 9,505,652 B2
(45) Date of Patent: Nov. 29, 2016

(54) LOW-EMISSIVITY TRANSPARENT LAMINATE AND BUILDING MATERIAL CONTAINING THE SAME

(71) Applicant: LG Hausys, Ltd., Seoul (KR)

(72) Inventors: Ung Kil Kim, Gunpo-si (KR); Youn Ki Jun, Gwacheon-si (KR); Dae Hoon Kwon, Anyang-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 14/653,103

(22) PCT Filed: Aug. 21, 2013

(86) PCT No.: PCT/KR2013/007481
§ 371 (c)(1),
(2) Date: Jun. 17, 2015

(87) PCT Pub. No.: WO2014/104530
PCT Pub. Date: Jul. 3, 2014

(65) Prior Publication Data
US 2015/0344358 A1 Dec. 3, 2015

(30) Foreign Application Priority Data
Dec. 24, 2012 (KR) .................. 10-2012-0151675

(51) Int. Cl.
*B32B 15/04* (2006.01)
*B32B 17/06* (2006.01)
*C03C 17/22* (2006.01)
(Continued)

(52) U.S. Cl.
CPC ............. *C03C 17/225* (2013.01); *C03C 17/23* (2013.01); *C03C 17/36* (2013.01); *C03C 17/366* (2013.01); *C03C 17/3626* (2013.01); *C03C 17/3644* (2013.01); *C03C 2217/70* (2013.01); *C03C 2217/78* (2013.01); *Y10T 428/265* (2015.01); *Y10T 428/31678* (2015.04)

(58) Field of Classification Search
USPC ....... 428/426, 428, 432, 433, 434, 688, 689, 428/697, 699, 701, 702
See application file for complete search history.

(56) References Cited

U.S. PATENT DOCUMENTS

| 2005/0186482 A1* | 8/2005 | Maschwitz ......... C03C 17/3423 430/1 |
| 2011/0135955 A1* | 6/2011 | Maschwitz ....... B32B 17/10036 428/623 |
| 2013/0057951 A1* | 3/2013 | Hevesi .................... C03C 17/36 359/359 |

FOREIGN PATENT DOCUMENTS

| JP | 2011131574 A | 7/2011 |
| JP | 2011173764 A | 9/2011 |

(Continued)

OTHER PUBLICATIONS

JP2011176764 English Machine translation.*
(Continued)

*Primary Examiner* — Lauren R Colgan
(74) *Attorney, Agent, or Firm* — Hauptman Ham, LLP

(57) ABSTRACT

Provided is a low-emissivity transparent laminate comprising a transparent substrate and a coating layer placed on the transparent substrate, wherein the coating layer has a multilayered structure sequentially comprising a low-emissivity layer, a buffer layer comprising a ZnSe-based composite metal nitride, and a dielectric layer from the transparent substrate.

16 Claims, 1 Drawing Sheet

(51) Int. Cl.
  *C03C 17/23* (2006.01)
  *C03C 17/36* (2006.01)

(56) References Cited

FOREIGN PATENT DOCUMENTS

| KR | 1019960004255 A | 2/1996 |
| KR | 1020070022009 A | 2/2007 |
| KR | 1020080015002 A | 2/2008 |
| KR | 1020080106952 A | 12/2008 |
| KR | 1020110062566 A | 6/2011 |
| KR | 1020130020029 A | 2/2013 |
| WO | WO2011147864 | * 12/2011 |

OTHER PUBLICATIONS

International Search Report for PCT/KR2013/007481 mailed on Oct. 28, 2013.

* cited by examiner

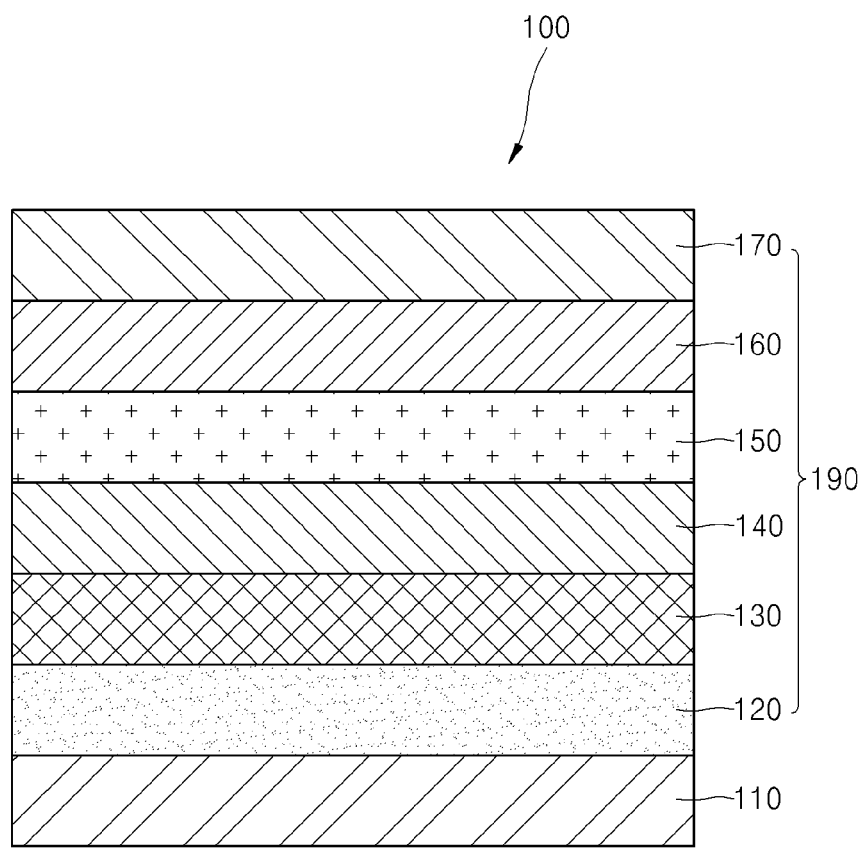

LOW-EMISSIVITY TRANSPARENT LAMINATE AND BUILDING MATERIAL CONTAINING THE SAME

CROSS REFERENCE TO RELATED APPLICATION

This application claims the priority of Korean Patent Application No. 10-2012-0151675, filed on Dec. 24, 2012 in the KIPO (Korean Intellectual Property Office). Further, this application is the National Phase application of International Application No. PCT/KR2013/007481 filed Aug. 21, 2013, which designates the United States and was published in Korean.

TECHNICAL FIELD

The present invention relates to a low-emissivity transparent laminate and a building material including the same.

BACKGROUND ART

Low-emissivity glass is glass on which a low-emissivity layer including a metal such as silver (Ag) having high reflectance in an infrared range is deposited as a thin film. The low-emissivity glass is a functional material providing energy saving effects by reflecting solar radiation in summer while trapping infrared rays generated from an indoor heater in winter.

Generally, low-e glass deposited by sputtering is soft low-e glass, and has a drawback in that the soft low-e glass cannot be used while a coating surface thereof is exposed to the outside in manufacture of multilayer insulating glass due to a problem of lower durability (for example, abrasion resistance and acid resistance) than hard low-e glass. In addition, since the coating surface of the soft low-e glass is likely to suffer from damage in the process of manufacturing the multilayer insulating glass, special attention is required in the manufacture process. Further, the soft low-e glass still has problems to be overcome, such as constraints in storage period until manufacture of the multilayer insulating glass after production of coating glass, and the like.

DISCLOSURE

Technical Problem

It is an aspect of the present invention to provide a low-emissivity transparent laminate which exhibits excellent abrasion resistance and scratch resistance through improvement in durability while securing thermal insulation properties and optical properties.

It is another aspect of the present invention to provide a building material including the low-emissivity transparent laminate as set forth above.

Technical Solution

In accordance with one aspect of the present invention, a low-emissivity transparent laminate includes a transparent substrate and a coating layer formed on the transparent substrate, wherein the coating layer has a multilayer structure including a low-emissivity layer, a buffer layer including a ZnSn-based composite metal nitride, and a dielectric layer, sequentially in an upward direction from the transparent substrate.

The coating layer may include a low-emissivity protective metal layer, which is laminated on at least one of both surfaces of the low-emissivity layer.

The coating layer may include a seed layer including an Al-doped Zn-based oxide on a surface of the low-emissivity layer toward a transparent substrate.

The coating layer may include the dielectric layer as an uppermost dielectric layer, and may include a lowermost dielectric layer on a surface thereof in contact with the transparent substrate.

The low-emissivity layer may have an emissivity of about 0.01 to about 0.3.

The low-emissivity layer may include at least one selected from the group consisting of Ag, Au, Cu, Al, Pt, ion-doped metal oxides, and combinations thereof.

The low-emissivity layer may have a thickness of about 6 nm to about 25 nm.

The low-emissivity protective metal layer may have an extinction coefficient of about 1.5 to about 3.5 in a visible light range.

The low-emissivity protective metal layer may include at least one selected from the group consisting of Ni, Cr, alloys of Ni and Cr, Ti, and combinations thereof.

The low-emissivity protective metal layer may have a thickness of about 1 nm to about 5 nm.

The buffer layer may include a compound represented by $ZnSnN_x$ (where, about $1.5 \leq x \leq$ about $2.5$).

The buffer layer may have a thickness of about 1 nm to about 10 nm.

The dielectric layer may have a thickness of about 5 nm to about 60 nm.

The transparent substrate may have a visible light transmittance of about 90% to about 100%.

The transparent substrate may be a glass or transparent plastic board.

The coating layer may include the buffer layer as a first buffer layer, and may further include a second buffer layer including a ZnSn-based composite metal nitride on an upper side of the dielectric layer.

In accordance with another aspect of the present invention, a building material including the low-emissivity transparent laminate as set forth above is provided.

Advantageous Effects

The low-emissivity transparent laminate exhibits improved abrasion resistance and scratch resistance while securing thermal insulation properties and optical properties, whereby soft low-e glass can exhibit improved processing properties.

DESCRIPTION OF DRAWINGS

FIG. 1 is a schematic sectional view of a low-emissivity transparent laminate according to one embodiment of the present invention.

BEST MODE

Hereinafter, embodiments of the present invention will be described in detail with reference to the accompanying drawings. It should be understood that the following embodiments may be embodied in different ways and are not to be in any way construed as limiting the present invention.

In the drawings, portions irrelevant to the description are omitted for clarity. Like components will be denoted by like reference numerals throughout the specification.

In the drawings, thicknesses of several layers and regions are enlarged for clarity. In addition, thicknesses of some layers and regions are exaggerated for convenience.

It will be understood that when an element such as a layer, film, region or substrate is referred to as being placed "on" (or under or below) another element, it can be directly placed on (or under or below) the other element, or intervening layer(s) may also be present.

Hereinafter, a low-emissivity transparent laminate 100 according to one embodiment of the invention will be described in detail with reference to FIG. 1.

FIG. 1 is a sectional view of a low-emissivity transparent laminate 100 according to one embodiment of the present invention, which includes a transparent substrate 110 and a coating layer 190. The coating layer 190 has a multilayer structure that includes a low-emissivity layer 140, a buffer layer 160 including a ZnSn-based composite metal nitride, and a dielectric layer 170 including a ZnSn-based composite metal oxide, sequentially in an upward direction from the transparent substrate 110.

The buffer layer 160 of the low-emissivity transparent laminate 100 serves as a buffer layer between the low-emissivity layer 140 and the dielectric layer 170, and thereby improves durability of the dielectric layer 170.

The coating layer 190 has a multilayer thin film structure based on the low-emissivity layer 140 selectively reflecting far infrared rays of sunlight, and imparts thermal insulation properties due to low-emissivity (low-e) to the low-emissivity transparent laminate 100 by reducing emissivity. The low-emissivity transparent laminate 100 having such a structure is a functional material realizing energy saving effects for buildings by reflecting solar radiation in summer while trapping infrared rays generated from an indoor heater in winter.

The term "emissivity" as used herein refers to a ratio by which an object absorbs, transmits and reflects energy having any specific wavelength. That is, the term "emissivity" as used herein indicates a degree of absorption of infrared energy in an infrared wavelength range, and specifically refers to a ratio of absorbed infrared energy to applied infrared energy when far infrared rays, which correspond to a wavelength range from about 5 μm to about 50 μm and exhibit strong thermal action, are applied.

According to Kirchhoff's law of thermal radiation, since infrared energy absorbed by a certain material is the same as energy radiated back from the material, absorptivity of the material is the same as emissivity thereof.

In addition, since infrared energy not absorbed by a material is reflected by a surface of the material, emissivity becomes lower with increasing reflectance of infrared energy. This relationship is represented by Formula: Emissivity=1-reflectance of infrared light.

Emissivity may be measured through various methods typically known in the art. For example, emissivity may be measured using an apparatus such as a Fourier transform infrared spectrometer (FT-IR) in accordance with KSL2514, without being limited thereto.

Absorptivity for far infrared rays exhibiting strong thermal action, that is, emissivity for far infrared rays, may have a very important meaning in measurement of a degree of thermal insulation.

As described above, since the low-emissivity transparent laminate 100 includes the coating layer 190 formed on the transparent substrate 110 such as a glass substrate and the like, the low-emissivity transparent laminate 100 can exhibit reduced emissivity while maintaining certain transmissivity in a visible light range, and thus can be used as an energy-saving functional material for buildings providing excellent thermal insulation.

The low-emissivity layer 140 is formed of an electrically conductive material having low-emissivity, for example, metal, and has low sheet resistance, thereby securing low-emissivity. For example, the low-emissivity layer 140 may have an emissivity of about 0.01 to about 0.3, specifically from about 0.01 to about 0.2, more specifically from about 0.01 to about 0.1, still more specifically from about 0.01 to about 0.08. Within this range, the low-emissivity transparent laminate 100 can exhibit appropriate properties in terms of both thermal insulation and visible light transmittance. The low-emissivity layer 140 having an emissivity within this range may have a sheet resistance of about 0.78 Ω/sq to about 6.42 Ω/sq, as measured on a thin film specimen.

The low-emissivity layer 140 serves to selectively transmit and reflect solar radiation. The low-emissivity layer 140 may include at least one selected from the group consisting of Ag, Au, Cu, Al, Pt, ion-doped metal oxides, and combinations thereof, without being limited thereto. Examples of the ion-doped metal oxides include indium tin oxide (ITO), fluorine-doped tin oxide (FTO), Al-doped zinc oxide (AZO), gallium zinc oxide (GZO), and the like. In one embodiment, the low-emissivity layer 140 may be silver (Ag), and thus, the low-emissivity transparent laminate 100 can realize high electrical conductivity, low absorptivity in the visible light range, excellent durability, and the like.

The low-emissivity layer 140 may have a thickness of, for example, about 6 nm to about 25 nm. The low-emissivity layer 140 having a thickness within this range is suitable to simultaneously realize low-emissivity and high visible light transmittance.

The buffer layer 160 including the ZnSn-based composite metal nitride is interposed between the low-emissivity layer 140 and the dielectric layer 170 including the ZnSn-based composite metal oxide, and serves as a protective film protecting the low-emissivity layer 140 from influence of oxygen of the oxide included in the dielectric layer 170, thereby serving to stabilize an interface between metal and the dielectric layer.

In addition, as described above, the low-emissivity transparent laminate 100 includes the buffer layer 160 formed before deposition of the dielectric layer 170 onto an upper side of the low-emissivity layer 140, and the dielectric layer 170 stacked on an upper side of the buffer layer 160 can exhibit improved abrasion resistance.

The ZnSn-based composite metal nitride included in the buffer layer 160 and the ZnSn-based composite metal oxide included in the dielectric layer 170 use the same ZnSn-based metal, and thus can protect the low-emissivity layer 140 and the dielectric layer 170 through action as described above.

In one embodiment, the buffer layer 160 may include a compound represented by $ZnSnN_x$ (where, $1.5 \leq x \leq 2.5$).

The buffer layer 160 may have a thickness of, for example, about 1 nm to about 10 nm. Since the ZnSn-based composite metal nitride such as $ZnSnN_x$ has a higher absorption coefficient than other dielectric layers, the buffer layer 160 can have a problem of deterioration in transmittance if the thickness thereof is increased to 10 nm or more.

The dielectric layer 170 may include the ZnSn-based composite metal oxide having an index of refraction from about 1.5 to about 2.3. Depending upon the index of refraction of the dielectric layer 170, the thickness of the dielectric layer 170 may be adjusted such that transmittance, reflectance, and transmissive and reflective colors of the dielectric layers can be realized to desired target levels.

The dielectric layer 170 may have a thickness of, for example, about 5 nm to about 60 nm. The thickness of the dielectric layer 170 may be variously adjusted depending upon the location and material of the dielectric layer so as to realize optical properties (transmittance, reflectance, color index) of the overall multilayer thin film satisfying target properties. Within the above thickness range, the dielectric layer 170 enables effective control of optical properties of the multilayer thin film and can provide an advantage in terms of production rate.

In addition, the dielectric layer 170 may be formed of a material having an extinction coefficient close to 0. An extinction coefficient of greater than 0 means that incident light is absorbed by the dielectric layer before reaching a light absorption metal layer, and is not advantageous in that transparency is inhibited. Therefore, the dielectric layer 170 may have an extinction coefficient of less than 0.1 in the visible light range (wavelength range from about 380 nm to about 780 nm).

Generally, since a metal used as the low-emissivity layer 140 is likely to be oxidized, the dielectric layer 170 may serve as an anti-oxidation film for the low-emissivity layer 140. In addition, the dielectric layer 170 also serves to increase visible light transmittance.

The dielectric layer 170 may further include various metal oxides, metal nitrides and the like in addition to the ZnSn-based composite metal oxide.

The optical properties of the low-emissivity transparent laminate 100 may be adjusted by suitably adjusting materials and properties of the dielectric layer 170. In addition, the dielectric layer 170 may be composed of a plurality of layers.

The coating layer 190 may further include a layer formed of a material known in the art between the respective layers. For example, the low-emissivity transparent laminate 100 may include a low-emissivity protective metal layer, which is laminated on at least one of both surfaces of the low-emissivity layer 140.

The low-emissivity protective metal layer 150 is formed of a metal exhibiting excellent light absorption and performs a function of controlling sunlight. A color realized by the low-emissivity transparent laminate 100 may be adjusted by adjusting materials, thicknesses and the like of the low-emissivity protective metal layer 150.

In one embodiment, the low-emissivity protective metal layer 150 may have an extinction coefficient of about 1.5 to about 3.5 in the visible light range. The extinction coefficient is a value derived from an optical constant which is an inherent property of a material, and the optical constant is represented by an expression, n-ik. Here, the real part n is an index of refraction, and the imaginary part k is an extinction coefficient (also referred to as absorption coefficient). The extinction coefficient is a function of wavelength ($\lambda$), and metal generally has an extinction coefficient of greater than 0. The extinction coefficient k and the absorption coefficient $\alpha$ are expressed by Formula: $\alpha=(4\pi k)/\lambda$. When the absorption coefficient is $\alpha$ and the thickness through which light passes is d, the intensity of light passing through the thickness d (I) is decreased according to Formula $I=I0\exp(-\alpha d)$, as compared with the intensity of incident light (I0).

The low-emissivity protective metal layer 150 absorbs a certain portion of visible light using a metal having an extinction coefficient within the above range in the visible light range, thereby allowing the low-emissivity transparent laminate 100 to have a certain color.

For example, the low-emissivity protective metal layer 150 may include at least one selected from the group consisting of Ni, Cr, alloys of Ni and Cr, Ti, and combinations thereof, without being limited thereto.

The low-emissivity protective metal layer 150 may have a thickness of, for example, about 1 nm to about 5 nm. Within this range, the low-emissivity protective metal layer 150 can allow the low-emissivity transparent laminate 100 to have certain transmittance and reflectance while serving as a low-emissivity protective layer.

The transparent substrate 110 may be a transparent substrate having high transmittance of visible light, for example, a glass or transparent plastic board having a visible light transmittance of about 90% to about 100%. For example, the transparent substrate 110 may be any glass used for construction, and may have a thickness of, for example, about 2 mm to about 12 mm depending upon application.

As described above, the coating layer 190 may have a multilayer structure further including additional layers in addition to the layers as set forth above, as needed, for example, in order to realize an optical spectrum suitable for usage.

In one embodiment, the coating layer 190 may include a seed layer 130 including an Al-doped Zn-based oxide on a surface of the low-emissivity layer 140 toward a transparent substrate 110.

The low-emissivity layer 140 is formed on an upper side of the seed layer 130 by deposition, thereby facilitating deposition of the low-emissivity layer 140.

In another embodiment, the coating layer 190 may include the dielectric layer 170 as an uppermost dielectric layer, and may further include a lowermost dielectric layer 120 on a surface thereof in contact with the transparent substrate 110. Details of the lowermost dielectric layer 120 are as described above in relation to the dielectric layer 170.

The low-emissivity transparent laminate 100 may be manufactured by stacking each of the layers of the coating layer 190 on an upper side of the transparent substrate 110 in order using a method known in the art. Each of the layers may be stacked, for example, by deposition, and deposition may be performed by any method known in the art without limitation. For example, each of the layers may be deposited using a magnetron sputter.

Since the low-emissivity transparent laminate 100 is formed of soft low-e glass formed by deposition, the low-emissivity transparent laminate 100 overcomes a durability problem of soft low-e glass by securing excellent durability of the uppermost dielectric layer 170 and allowing optical properties to be controlled in various ways while securing excellent thermal insulation properties.

In another embodiment, the coating layer 190 may include the buffer layer 160 as a first buffer layer, and may further include a second buffer layer (not shown) including a ZnSn-based composite metal nitride on an upper side of the dielectric layer 170. As such, the coating layer 190 may include two or more buffer layers, thereby further improving durability of the dielectric layer 170.

In accordance with another aspect of the present invention, a building material includes the low-emissivity transparent laminate 100 as set forth above. Since the building material uses the low-emissivity transparent laminate 100, the building material exhibits excellent durability and thus improved heat resistance while securing thermal insulation properties and optical properties due to low-e, as described above. The building material may be subjected to, for example, heat treatment for improvement of wind pressure resistance, and may be used as a building material for skyscrapers.

Next, the present invention will be described in more detail with reference to some examples. It should be understood that these examples are provided for illustration only and are not to be construed in any way as limiting the present invention.

EXAMPLES

Example 1

A low-emissivity transparent laminate, in which a multilayer-structured low-emissivity coating layer having components and thicknesses as listed in Table 1 was formed, was manufactured using a magnetron (C-Mag) sputter (Cetus-S, Selcos Co., Ltd.).

First, a $ZnSnO_x$ lowermost dielectric layer was deposited to a thickness of 6 nm onto a 6 mm thick transparent glass substrate in an oxygen/argon atmosphere (50 vol % of oxygen, 50 vol % of argon). Next, a $ZnAlO_x$ seed layer was deposited to a thickness of 3 nm in an oxygen/argon atmosphere (25 vol % of oxygen, 75 vol % of argon). An Ag low-emissivity layer and a NiCr low-emissivity protective metal layer were deposited to thicknesses of 19 nm and 1.5 nm onto an upper side of the seed layer in a 100 vol % argon atmosphere, respectively, followed by depositing a $ZnSnN_x$ buffer layer to a thickness of 10 nm in a nitrogen/argon atmosphere (83 vol % of nitrogen, 17 vol % of argon). Finally, a $ZnSnO_x$ uppermost dielectric layer was deposited to a thickness of 62 nm under the same conditions as the $ZnSnO_x$ layer, thereby manufacturing the low-emissivity transparent laminate.

Example 2

A low-emissivity transparent laminate was manufactured in the same manner as in Example 1 except that a 10 nm thick $ZnSnN_x$ layer was additionally applied to an uppermost side.

Comparative Example 1

A low-emissivity transparent laminate was manufactured in the same manner as in Example 1 except that the $ZnSnN_x$ layer was omitted from the multilayer-structured coating layer.

Comparative Example 2

A low-emissivity transparent laminate was manufactured in the same manner as in Example 1 except that a $SiAlN_x$ layer was deposited to a thickness of 10 nm in a nitrogen/argon atmosphere (20 vol % of nitrogen, 80 vol % of argon) instead of the $ZnSnN_x$ layer.

Comparative Example 3

A low-emissivity transparent laminate was manufactured in the same manner as in Example 2 except that a $SiAlN_x$ layer was deposited instead of the $ZnSnN_x$ layer.

TABLE 1

| | Multilayer structure (Film thickness, nm) |
|---|---|
| Example 1 | Transparent glass substrate/$ZnSnO_x$(6)/$ZnAlO_x$(3)/Ag(19)/NiCr(1.5)/$ZnSnN_x$(10)/$ZnSnO_x$(62) |
| Example 2 | Transparent glass substrate/$ZnSnO_x$(6)/$ZnAlO_x$(3)/Ag(19)/NiCr(1.5)/$ZnSnN_x$(10)/$ZnSnO_x$(62)/$ZnSnN_x$(10) |
| Comparative Example 1 | Transparent glass substrate/$ZnSnO_x$(6)/$ZnAlO_x$(3)/Ag(19)/NiCr(1.5)/$ZnSnO_x$(62) |
| Comparative Example 2 | Transparent glass substrate/$ZnSnO_x$(6)/$ZnAlO_x$(3)/Ag(19)/NiCr(1.5)/$SiAlN_x$(10)/$ZnSnO_x$(62) |
| Comparative Example 3 | Transparent glass substrate/$ZnSnO_x$(6)/$ZnAlO_x$(3)/Ag(19)/NiCr(1.5)/$SiAlN_x$(10)/$ZnSnO_x$(62)/$SiAlN_x$(10) |

Evaluation

The low-emissivity transparent laminates manufactured in Examples 1 to 2 and Comparative Examples 1 to 3 were evaluated as to abrasion resistance according to the following method.

An abrasion resistance test was performed using a Taber Abraser (model: 5135 Rotary Platform Abraser, Erichsen Co., Ltd.). An abrasive wheel had a weight of 0.5 Kg. An abrasive cloth (Erichsen Co., Ltd., in accordance with DIN 68861) was mounted on the wheel, followed by placing the wheel on a coating surface of the coating layer. Next, the abrasive wheel on which the abrasive cloth was mounted was rotated 500 times. Abrasion scratches on the coating surface of the specimen after completion of the abrasion resistance test were observed by the naked eye, and widths of the scratches were observed by a depth profiler (model: Dektak XT, Bruker Co., Ltd.) and an optical microscope (50×, 100×, 200×, 500×, 1000×). Results are shown in Table 2. Each of the numbers as listed in Table 2 was obtained by counting scratches having a width of 50 μm or more among all the scratches on the specimen. Here, a size of 50 μm corresponds to the minimum size distinguishable by the naked eye.

TABLE 2

| | Number of scratches |
|---|---|
| Example 1 | 30 |
| Example 2 | 30 |
| Comparative Example 1 | 200 |
| Comparative Example 2 | 300 |
| Comparative Example 3 | 100 |

Referring to Table 2, it can be seen that the $ZnSnO_x$ layer exhibited higher abrasion resistance in the specimens of Examples 1 to 2, in which the $ZnSnN_x$ layer was used as a buffer layer for the $ZnSnO_x$ layer, than in the specimen of Comparative Example 1, in which the $ZnSnN_x$ layer was not used as the buffer layer for the $ZnSnO_x$ layer. In addition, it can be seen that the $ZnSnO_x$ layer exhibited lower abrasion resistance in the specimen of Comparative Example 2, in which the $SiAlN_x$ layer was used as the buffer layer to prevent oxidation of the metal layer that can occur in a reinforcing process, than in the case that the buffer layer was not used.

From the above results, it can be confirmed that, when a $ZnSnN_x$ layer is applied as a buffer layer onto a NiCr layer before deposition of a $ZnSnO_x$ layer, the $ZnSnO_x$ layer deposited onto the upper side of the $ZnSnN_x$ layer can exhibit improved abrasion resistance.

LIST OF REFERENCE NUMERALS

100, 200: Low-emissivity transparent laminate
110, 210: Transparent substrate
140, 240: Low-emissivity layer

150, 250: Low-emissivity protective metal layer
160, 260: Buffer layer
220: Lowermost dielectric layer
230: Seed layer
270: Uppermost dielectric layer
190, 290: Coating layer

The invention claimed is:

1. A low-emissivity transparent laminate comprising:
a transparent substrate; and
a coating layer formed on the transparent substrate, wherein
the coating layer has a multilayer structure comprising:
  a lowermost dielectric layer on top of the transparent substrate and having a lower surface in contact with the transparent substrate, the lowermost dielectric layer is a $ZnSnO_x$ layer;
  a seed layer on top of the transparent substrate, the seed layer comprising an Al-doped Zn-based oxide;
  a low-emissivity layer on top of the seed layer;
  a first buffer layer on top of the low-emissivity layer, the first buffer layer is a $ZnSnN_x$ layer;
  an uppermost dielectric layer on top of the first buffer layer, the uppermost dielectric layer is a $ZnSnO_x$ layer; and
  a second buffer layer on top of the uppermost dielectric layer, the second buffer layer is a $ZnSnN_x$ layer.

2. The low-emissivity transparent laminate according to claim 1, wherein the multilayer structure of the coating layer further comprises a low-emissivity protective metal layer, which is laminated on at least one or both surfaces of the low-emissivity layer.

3. The low-emissivity transparent laminate according to claim 2, wherein the low-emissivity protective metal layer has an extinction coefficient of 1.5 to 3.5 in a visible light range.

4. The low-emissivity transparent laminate according to claim 2, wherein the low-emissivity protective metal layer comprises at least one selected from the group consisting of Ni, Cr, alloys of Ni and Cr, Ti, and combinations thereof.

5. The low-emissivity transparent laminate according to claim 2, wherein the low-emissivity protective metal layer has a thickness of 1 nm to 5 nm.

6. The low-emissivity transparent laminate according to claim 1, wherein the low-emissivity layer has an emissivity of 0.01 to 0.3.

7. The low-emissivity transparent laminate according to claim 1, wherein the low-emissivity layer comprises at least one selected from the group consisting of Ag, Au, Cu, Al, Pt, ion-doped metal oxides, and combinations thereof.

8. The low-emissivity transparent laminate according to claim 1, wherein the low-emissivity layer has a thickness of 6 nm to 25 nm.

9. The low-emissivity transparent laminate according to claim 1, wherein the first buffer layer comprises a compound represented by $ZnSnN_x$, (where, $1.5 \leq x \leq 2.5$).

10. The low-emissivity transparent laminate according to claim 1, wherein the first buffer layer has a thickness of 1 nm to 10 nm.

11. The low-emissivity transparent laminate according to claim 1, wherein at least one of the uppermost and lowermost dielectric layers has a thickness of 5 nm to 60 nm.

12. The low-emissivity transparent laminate according to claim 1, wherein the transparent substrate has a visible light transmittance of 90% to 100%.

13. The low-emissivity transparent laminate according to claim 1, wherein the transparent substrate is a glass or transparent plastic board.

14. The low-emissivity transparent laminate according to claim 1, wherein the uppermost dielectric layer is in direct contact with each of the first and second buffer layers.

15. The low-emissivity transparent laminate according to claim 1, wherein the uppermost dielectric layer is in direct contact with each of the first and second buffer layers.

16. A building material comprising the low-emissivity transparent laminate according to claim 1.

* * * * *